Feb. 23, 1954
H. H. MUELLER
PHONOGRAPH RECORD DISK SAFETY AND
INTERLOCKING STORAGE ALBUM
2,670,261
Filed May 12, 1950
4 Sheets-Sheet 1
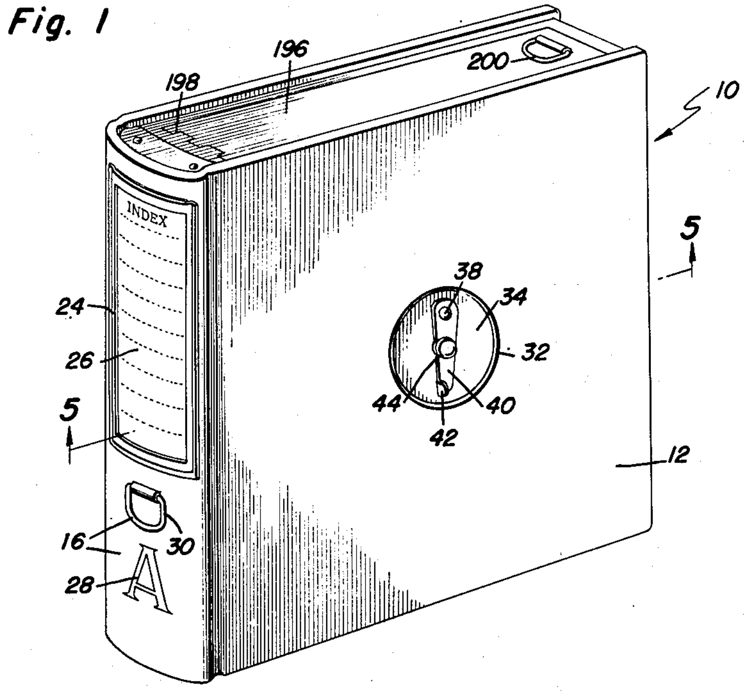
Fig. 6
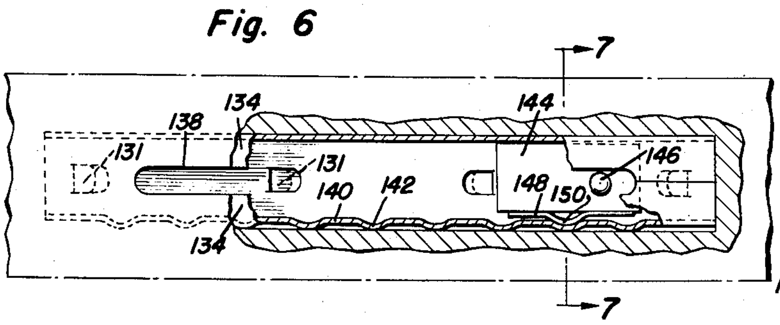
Fig. 7
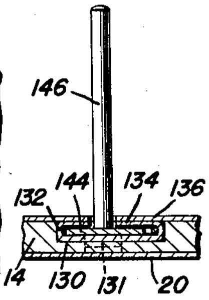
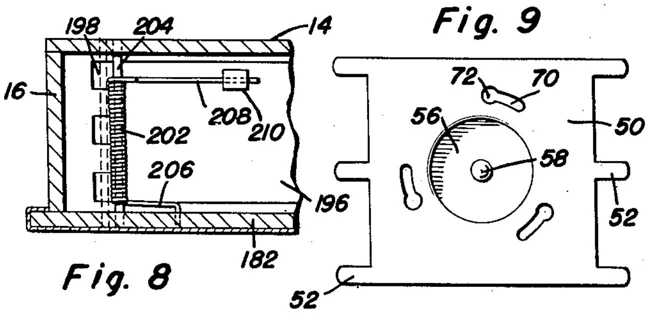
Fig. 8, Fig. 9
Herman H. Mueller
INVENTOR.
BY Clarence A. O'Brien
and Harvey B. Jacobson
Attorneys Herman H. Mueller
INVENTOR.

BY Clarence A. O'Brien
and Harvey B. Jacobson
Attorneys

Feb. 23, 1954 | H. H. MUELLER | 2,670,261

PHONOGRAPH RECORD DISK SAFETY AND INTERLOCKING STORAGE ALBUM

Filed May 12, 1950 | 4 Sheets-Sheet 3

Herman H. Mueller
INVENTOR.

BY Clarence A. O'Brien and Harvey B. Jacobson
Attorneys

Feb. 23, 1954 H. H. MUELLER 2,670,261

PHONOGRAPH RECORD DISK SAFETY AND INTERLOCKING STORAGE ALBUM

Filed May 12, 1950 4 Sheets-Sheet 4

Herman H. Mueller

INVENTOR.

BY Clarence A. O'Brien and Harvey B. Jacobson

Attorneys

Patented Feb. 23, 1954

2,670,261

UNITED STATES PATENT OFFICE 2,670,261

PHONOGRAPH RECORD DISK SAFETY AND INTERLOCKING STORAGE ALBUM

Herman H. Mueller, Ephrata, Pa., assignor of 5.58% to George L. Bowman, Ephrata, 14% to Stanley A. Radzay, Ephrata, Pa., 14% to Henry Seidenberg, Malverne, N. Y., 2.92% to John L. Bowman, Denver, 7% to W. Hensel Brown, Lancaster, 3.25% to C. Eugene Miller, Ephrata, and 3.25% to Lillian Hess Kurtz, Lancaster, Pa.

Application May 12, 1950, Serial No. 161,519

11 Claims. (Cl. 312—10)

1

This invention comprises novel and useful improvements in a phonograph record disks safety and interlocking storage album, and more specifically pertains to an album or storage container specifically designed for storing with greater efficiency, protection and safety all conventional types of phonograph record disks and more specifically record disks of the interlocking type such as those disclosed in my copending application, Serial No. 726,934, for Interlocking Phonograph Record Disk, filed February 26, 1947, now Patent Number 2,559,786, issued July 10, 1951.

In some respects, the invention disclosed in the present application is similar to but generally represents a considerable improvement over the phonograph disk album set forth in my copending application, Serial No. 70,974, for Phonograph Record Album, filed June 14, 1949, and issued on March 27, 1951, as Patent No. 2,546,670.

Albums and containers for storing phonograph record disks have been heretofore known which did indeed serve the primary functions of enclosing one or more disks and retained the disks in clamped engagement to form a stock of disks within the album. However, for all types of phonograph record disks, and very especially for the more sensitive types of record disks in modern use, any attrition or wear upon the sound track of the disks very seriously and detrimentally affects the life of the same, the tonal qualities and characteristics of the sound reproduction from the disk, and results in a serious and frequently irreparable loss for certain types of records. As pointed out in the above mentioned copending applications, the above-mentioned problem is greatly augmented by the increased abrasive and attrition effects resulting from the presence of small particles of grit or dirt which may adhere to various portions of the sound tracks of one or more of the records, so that any relative movement, particularly a rotational movement between the stacked records in an album or container will, in a very short time, seriously damage the records in the manner aforesaid.

Moreover, even in the absence of the additional effects of particles of grit or dirt in the sound tracks of disks, the natural warpage which results from even the most careful usage of record disks will tend to cause unwanted contact between the sound tracks of adjacent disks, likewise contributing to the above-mentioned objectionable phenomena.

2

In order to effectively overcome the aforesaid disadvantages and serious problems of the prior art, it would be necessary to not only completely enclose the disks to be stored in a protective casing or housing, but to mount the disks in a substantially rigid assembly which will prevent not only axial or lateral movement of the disks relative to each other and to their container, but also will positively prevent rotational movement of the disks with respect to one another.

Accordingly, it is the primary general object of this invention to provide a storage album or container which shall be equally capable of efficiently storing and protecting all of the conventional types of phonograph record disks against damage and in a compact manner during storage; which will firmly clamp together, in a substantially unitary stack, a plurality of record disks of any of the conventional sizes either segregated or in a stack including various sizes and types of disks. Further, the primary general object of this invention is to permit the storage of not only various conventional types of record disks, but also the storage of even warped disks of the various types and in such a manner as to prevent contact of the sound tracks of adjacent disks and/or obviate relative movement and damage of adjacent surfaces of adjacent sound tracks. A still further general object and purpose of the invention is to provide a phonograph album or storage container of the type previously mentioned, which shall not only provide means for compactly and effectively storing a stack of disks of various conventional types and sizes, but when open will facilitate the use of selected disks from the album; and provide a protecting and storage space for disks which have been temporarily placed to one side while other disks are being utilized.

More specifically, it is an important object of the present invention to provide an improved manner and structure of a portable, light-weight and attractive and inexpensive nature, for more effectively and with greater safety storing records of all types and sizes with their sound tracks spaced from each other and from any other contiguous surface.

A further important object of the invention is to provide an improved manner and structure as set forth in the foregoing object which shall effectively store even warped disks while attaining the above objects.

An additional important object of the invention is to provide a storage album or container in accordance with the preceding objects which shall more effectively and efficiently support the stored records in such a manner as to positively prevent relative radial or axial displacement or motion of the same.

A still further important object of the invention is to provide an improved record album according to the above objects which will support the stored records so as to effectively prevent relative rotation between the records.

Yet another object of the invention is to provide a storage album as set forth in the above mentioned objects which is capable of attaining the desired results even when less than the full capacity of the album is being employed.

Still another very important object of the invention is to provide an improved record storage album in accordance with the foregoing objects which shall be effective for the purposes intended despite the use of the same for storing different types of conventional records; and despite the storing at one time of different types of records in the album.

Still further, it is an important object of the invention to provide an improved album which shall afford improved, compactly provided and concealed means for compactly storing various accessories for use with an album in adapting the same to accommodate different types of record disks.

It is a still further important object of the invention to provide an improved record storage album in which the means for retaining the plurality of record disks therein in a compact stack is further utilized to retain the covers of the album in a securely closed but easily releasable manner.

An additional important object of the invention is to provide an improved record storage album in which one cover of the album is utilized for supporting in an improved manner a stack of records while affording substantially complete access to the edges of the same for handling or removing the records.

An additional very important object of the invention is to provide an album in conformity with the preceding object in which the front cover of the album is additionally employed as a closure for covering the top and surrounding the sides of the stacks of records secured to the base or back cover of the album.

Yet another very important object of the invention is to provide an improved album incorporating therein improved record disk positioning and record disk retaining means which shall be capable of ready modification to accommodate all conventional types of record disks.

And a final important object of the invention to be specifically enumerated herein is to provide an improved record album as set forth in the foregoing objects, and specifically as set forth in the preceding object, in which the records are automatically elevated to facilitate access to and handling of the same upon the removal of the record clamping or locking means.

These, together with various ancillary features and objects of the invention which will later become apparent as the following description proceeds, are attained by the present invention, a preferred embodiment of which has been illustrated, by way of example only, in the accompanying drawings, wherein:

Figure 1 illustrates in perspective, by way of exemplification of the principles of this invention only, one embodiment of the same which is adapted to function as a phonograph record disk album;

Figure 2 is a top plan view of the album of Figure 1 opened, certain parts being shown in section, the cover of an accessory storage compartment being indicated in closed position in full lines and in open position in dotted lines therein, the position of a record in its permanently stored position being shown in dotted lines at the right of Figure 2 and the position of a record in temporarily stored position being indicated in dotted lines at the left of Figure 2;

Figure 6 is a detail view upon an enlarged scale and taken in top plan, parts being broken away and shown in section, of a portion of the adjustable stop construction mounted upon the back cover of the album and forming a part of this invention;

Figure 7 is a vertical transverse sectional detail view taken substantially upon the plane indicated by the section line 7—7 of Figure 6;

Figure 8 is a fragmentary detail view taken in an enlarged scale substantially upon the horizontal plane indicated by the section line 8—8 of Figure 2 and illustrating the hinged and spring-biased construction of a portion of a storage compartment cover forming a part of the invention;

Figure 9 is a top plan view of a blank having the spindle mounted thereon;

Figures 4, 15, 16, 17, 18, 19, 20, 21:
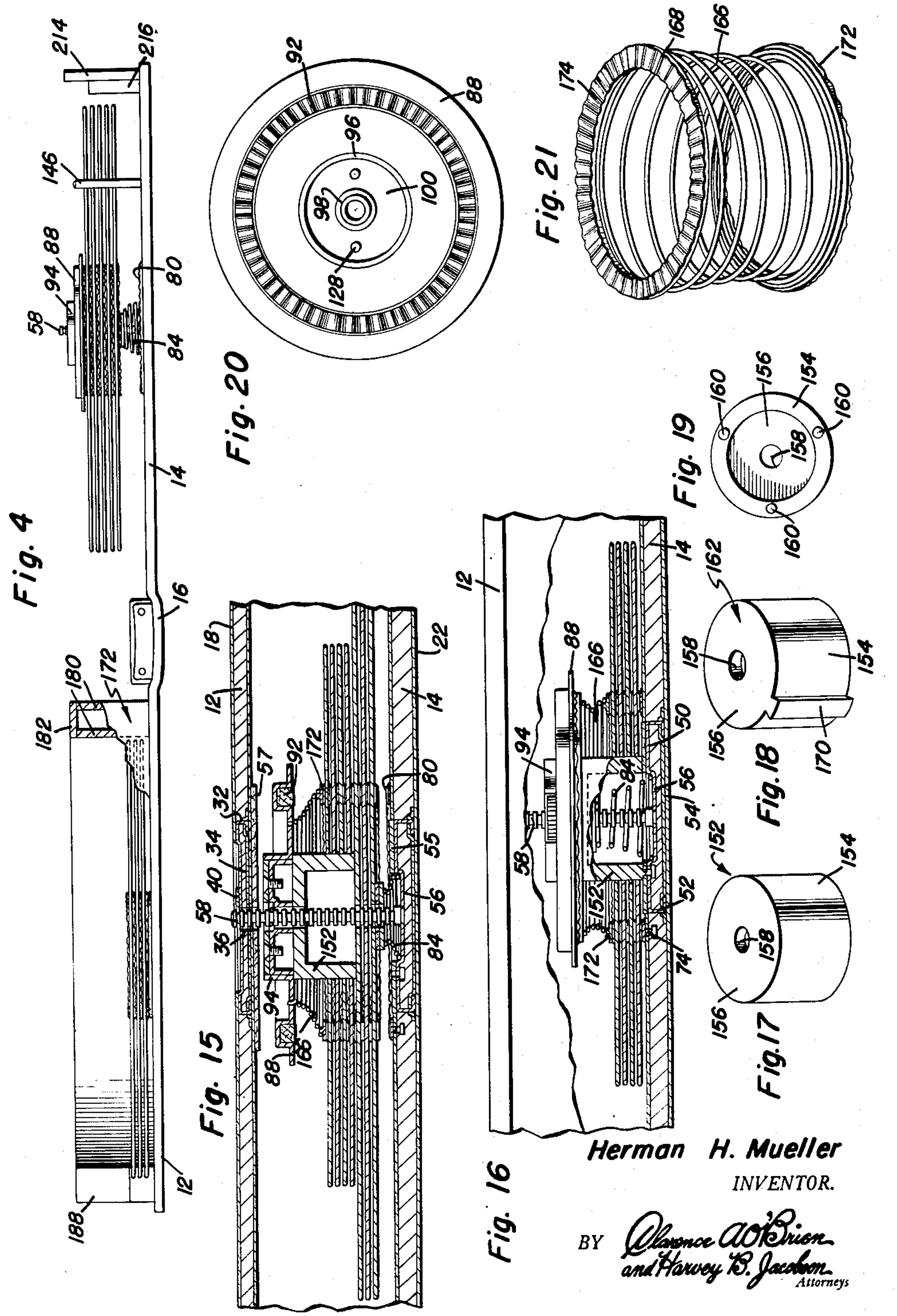
Figure 4 is a view similar to Figure 3 but showing the manner in which a stack of records is retained in the album both on the storing spindle at the right of Figure 4 and in the temporary storage well at the left of Figure 4, parts being broken away.
Figure 5:
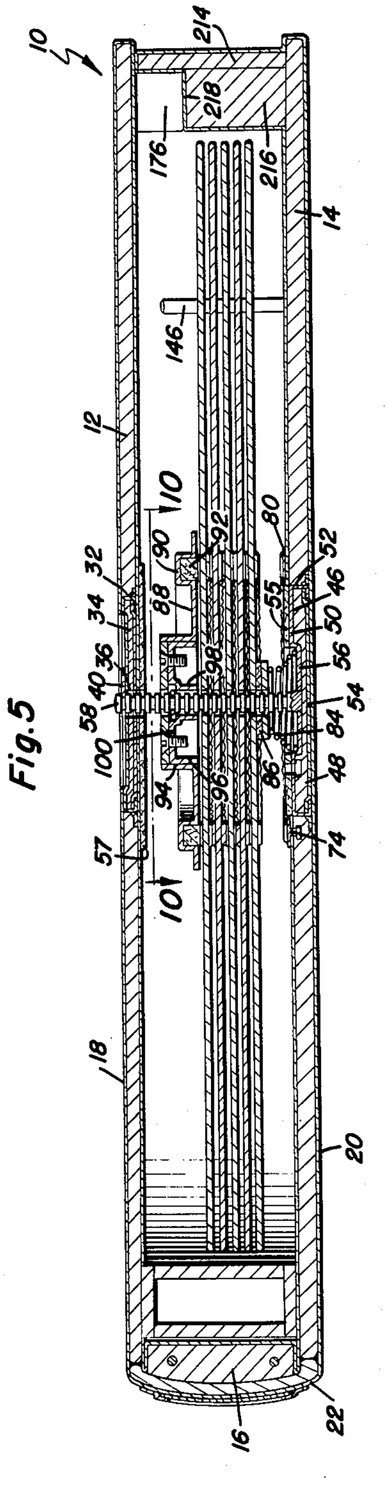
Figure 5 is a horizontal sectional view through the album in its closed position, the view being taken substantially upon the plane indicated by the section line 5—5 of Figure 1, the album being illustrated as containing a plurality of record disks all of the same size and being loaded to only a portion of its capacity.

Figure 15 is a fragmentary view, similar to Figure 5, but showing the album with certain attachments and adapters applied thereto for accommodating the conventional large record disks having a small spindle hole, together with a plurality of a conventional type of micro-groove or slow speed disks adapted to rotate at 33⅓ or 45 R. P. M. and having a greatly enlarged spindle opening therein;

Figure 16 is a view similar to Figure 15 but showing the invention incorporating certain of the adapters of this invention and utilized to store a stack of the small disks having the enlarged central aperture, a portion only of the storage capacity of the album being utilized;

Figure 17 is a perspective view of one of the adapter elements employed when it is desired to store the conventional so-called small disks;

Figure 18 is a view similar to Figure 17 of a further modification of adapter and having a keying rib for engaging a different type of record disk;

Figure 19 is a bottom plan view of the adapter of Figure 17;

Figure 20 is a bottom plan view of one form of spindle locking device, the same including a fixed clutch ring for interlocking engagement with disks of the interlocking type; and Figure 21 is a perspective view of a modified embodiment of adapter spring for use with the adapter sleeves of Figure 17 or 18 and with the lock of Figure 20.

Reference is now made more specifically to the accompanying drawings for an understanding of the fundamental and basic principles underlying this invention together with an explanation of applications of these principles in an exemplary embodiment of album or container, like numerals designating similar parts throughout the various views of the drawings.

*General album construction*

Referring first primarily to Figures 1–5, it will be observed that the device indicated generally by the numeral 10 constitutes an album or any other similar or appropriate container for the storage or transportation of phonograph record disks and is hereinafter referred to in this application as an album. The album includes a front cover or top 12, a back cover or base 14, and a center portion 16, these three members being joined together for relative hinging or folding movement. The album may be constructed of any desired material, such as cardboard, plastics, thin woods or sheet metals, as preferred, and the members 12, 14 and 16 may be suitably ornamented and artistically decorated by a covering or binding 18, 20 and 22, respectively, which may be separately applied to these members or may consist of a single sheet or piece of material.

Further, as shown best in Figure 1, the center 16 may conveniently have secured thereto a suitable frame or holder 24 of any desired character for detachably receiving an index or label 26 by means of which the contents of the album may be tabulated for easy visual inspection, while the center may be further provided with an indicia 28 of any desired character for generally identifying the particular album from a collection of albums and whereby the contents of the album may be listed in a catalog or the like. A pull ring or the like 30 may likewise be secured to the album upon the center 16 to facilitate removal of the album from a storage shelf or the like, handling of the album, and return of the album to the shelf or storage place.

*Album fastening device*

As will be best apparent from Figures 1, 5 and 15, the cover or front 12 of the album is provided with a recessed portion 32 in which is mounted a dished or concaved plate of sheet metal or the like, 34, having a central aperture 36 therein for the purpose of receiving a spindle as set forth hereinafter. Pivoted to the plate 34, by a rivet or the like 38, is a latch member 40 having a finger grip portion 42 thereon and an arcuate recess 44 in one edge thereof for engaging in locking relation the end of a spindle when the latter is extended through the aperture 36 in a manner to be hereinafter described.

While the concaved apertured plate and the latch member carried thereby are presently deemed preferable as a latching means to retain the cover and base of the album in closed position, it is evident that any other desired fastener could be provided for engaging the spindle to effect this result.

Referring next more particularly to Figures 5, 11–16, it will be seen that the back or base 14 is provided upon its upper and lower surfaces with shallow recesses 46 and 48, which, respectively receive an anchoring plate 50 and a retaining plate 54, in the form of sheet-like plates of metal or other suitable material. The former includes depending lugs 52 which extend downwardly through the material of the base 14 and through the retainer plate 54 seated in the recess 48. The depending lugs 52 are clinched to securely lock the anchor plate to the base member. The exterior surfaces of the plates 50 and 54 may be either or each covered wholly or partly by a concealing covering of any desired character, such as that of the covering 20.

Figures 10, 11, 12, 13, 14:
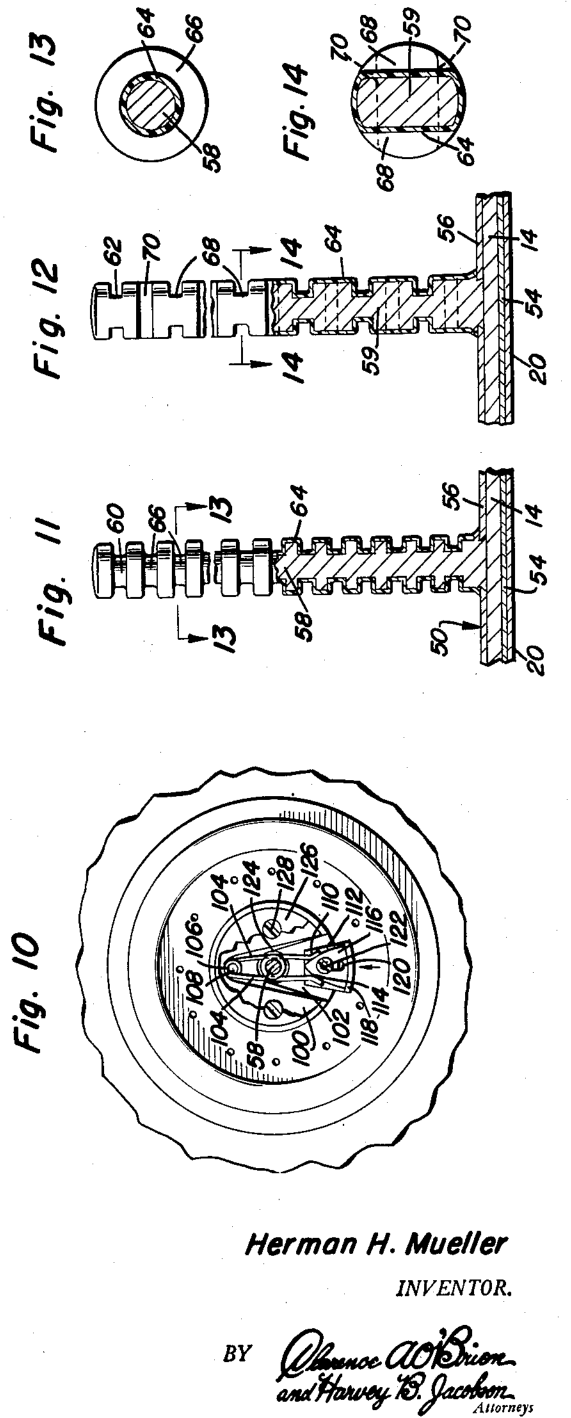
Figure 10 is a fragmentary top plan view, taken in horizontal section substantially upon the plane indicated by the section line 10—10 of Figure 5, of the spindle lock for clamping a stack of records, parts being broken away to show the internal construction of the lock.
Figure 11 is a fragmentary elevational view, parts being broken away and parts shown in section of one form of locking spindle forming a part of this invention.
Figure 12 is a view similar to Figure 11 but showing a modified construction of locking spindle in accordance with this invention.
Figure 13 is a horizontal sectional detail view taken substantially upon the plane indicated by the section line 13—13 of Figure 11.
Figure 14 is a horizontal sectional detail view taken substantially upon the plane indicated by the section line 14—14 of Figure 12.

The above-mentioned plate 50 has a circular central portion dished downwardly or recessed, as at 56, and rigidly secured axially of this recessed portion, as by being formed integral therewith or being separately formed but rigidly attached thereto in any desired manner, is an upstanding spindle, either 58 or 59, as shown in Figures 11 and 12. This spindle is so positioned and is of such dimension that the same will have its upper end extended into the central aperture 36 of the member 34, but preferably terminating in the cavity of the member 34, this extending portion being provided with a circumferentially extending annular groove 60, as shown in Figure 11, or circumferentially extending chordal slots 62 as shown in Figure 12, for the reception of the above-mentioned arcuate notch 44 of the latch member 40, whereby the engagement of the latch member in the slot 60 or 62 will serve to clamp the front or cover of the album to the spindle of the album, and consequently to the back or base member thereof.

Overlying the plate 50 upon the back cover 14 is a felt or equivalent pad 55 while a similar pad 57 overlies the surface of the apertured plate 34 which is attached to the front cover 12 in the same manner as that by which the spindle is secured to the back cover.

*Record receiving spindle*

In addition to the above described album fastening function, the spindle is intended to removably receive, support and clamp together in substantially immovable relation as set forth hereinafter, a plurality of phonograph record disks of any conventional type. Consequently, the spindle will be of an outside diameter which shall be capable of being snugly but freely slidable through the relatively small central spindle apertures of conventional record disks. Since damage or wear of the periphery of the spindle apertures of record disks would detrimentally affect the positioning of the record disks upon the turntables of phonographs, with a resultant detriment to the tonal characteristics of the sound reproduction of the records, it is desirable to minimize any wear at this point. Accordingly, the exterior surface of the spindle 58 is provided with a protecting or anti-friction coating 64 over all or any desired part of the exterior surface of the spindle for minimizing the wear between the contacting surfaces of the spindle end of the inner periphery of the spindle apertures of record disks. This coating could be of various materials such as soft or hard rubber, plastics, softer metals and the like, and could be applied in any desired manner.

At spaced intervals, preferably although not necessarily uniformly throughout its length, the spindle 58 or 59 is provided with a series of longitudinally spaced recesses or projections, such as the circumferentially extending annular grooves 66 shown in Figure 11, or with pairs of vertically spaced chordal slots 68 disposed on opposite sides of the stem 59 disclosed in Figure 12, the pairs of slots 68 being interdigitated with or disposed in staggered relation with respect to other pairs of slots 70 which are disposed at any predetermined angle circumferentially of the spindle with respect to the slots 68.

Conveniently, the grooves or ribs 66 can be spaced at such intervals that the distance of each is equal to or is an integer multiple of the thickness of a conventional record disk, of any particular type, such as a disk of the interlocking type illustrated throughout these drawings. In the arrangement of Figure 12, the spacing between a pair of slots 70 and the adjacent pair of angularly disposed slots 68 may likewise be of the same thickness or an integer multiple of the thickness of a conventional record disk.

These slots are adapted to be selectively engaged by a spindle locking means for retaining a stack of disks upon the spindle as set forth hereinafter, and it will be apparent that by spacing the slots as above indicated, any desired number of record disks may be effectively locked to the spindle as set forth hereinafter.

While the pairs of slots in Figure 12 have been illustrated as at right angles to each other, as will be apparent from Figure 14, it will be understood that various other angular relations could be employed as desired. Moreover, although the advantages of this invention are best attained by the slot arrangement hereinbefore described, it is to be understood that the broader principles of this invention envision within their purview the utilization of any other desired means for securing a locking member in longitudinally or vertically adjusted relation upon the spindle 58 or 59.

Referring again to the anchor plate 50, it will be seen from Figure 2 that the same is provided with a plurality of arcuately disposed slots 70, each of which terminates in an enlarged extremity 72, which constitutes part of a bayonet joint connection for detachably mounting on the anchor plate an accessory forming a part of this invention, as set forth hereinafter. Similarly, there are provided a plurality of headed fasteners 74 such as rivet-like members having enlarged extremities, one of which is embedded in the material of the base 14 and has its other end extending slightly thereabove and disposed in a circle about the center of the spindle 58 or 59 for the engagement by arcuate slots 76 cut in an annulus 80 and having enlarged extremities 78, the extremities 78 being adapted to pass over the headed fasteners 74, while the slots 76 will be retained beneath the heads of the fasteners, whereby the ring or annulus 80 of any desired material, and provided with interlocking teeth 82 may be detachably secured to the bottom cover 14.

Alternatively, where desired, a ring 80 could be employed provided with a felt surface instead of the teeth 82. The purpose of the toothed ring is to provide a stationary clutch member for interlocking engagement with the adjacent corresponding interlocking ring forming a part of a conventional interlocking record disk such as that set forth in my above identified copending applications, and illustrated in the drawings herein. A further function of the rings 80, whether toothed or of felt, is to engage the interlocking rings and/or the raised portions of record disks to assist in positively spacing their sound tracks when the disks are stacked on the spindle.

*Spindle lock member*

Reference is now made more particularly to Figures 5, 10 and 15 for an understanding of the construction of the spindle and record disk lock means. This preferably comprises a substantially flat plate or disk or other body 88 of any suitable material having an annular channel or groove formed in one surface thereof as at 90 for the reception of an annulus 92, which, as shown more clearly in Figure 20, is serrated or toothed in the same manner as the previously mentioned ring 90 and likewise for the purpose of establishing an interlocking engagement with the corresponding interlocking rings on the record disks. Alternatively, in place of the toothed ring 92, a ring of felt or similar material could be provided where the device is adapted for use with record disks which do not have the interlocking feature.

The plate 88 is provided with a cylindrical body or hub portion 94 in which is secured a cylindrical member 96 having an inner wall 98 slidably engaging the spindle 58, this cup-shaped body having further a top wall 100, which, as shown in Figure 10, is provided with a wedge-shaped depression 102 in which is mounted a resilient lock member. This member comprises a spring of any suitable material, such as resilient wire, a resilient metallic strip or the like, having a pair of arms 104 extending from a helical or looped portion 106 through which extends a pin 108 for securing the spring to the bottom surface of the depression 102, these arms having outwardly curving or inclined cam-like end portions 110 which rest upon the flat supporting surface 112 of a lock actuator for the lock and bear against the curving cam side walls 114 formed upon this actuator.

The lock actuator consists of a body 116 of metal or any other suitable material, preferably provided with an upturned flange or finger-grip portion 118, and has an elongated slot 120 extending through the body for the reception of a retaining pin 122 by means of which the body is secured to the surface 100 within the recess 102 but is permitted radial movement with respect thereto so as to selectively expand or permit contraction of the resilient spring portions 104. Intermediate their ends, the spring portions 104, as at 124, are adapted to selectively engage or release, depending upon whether they are contracted or expanded, any selected locking groove 66 and 68, 70 of the spindles 58 and 59 referred to hereinbefore. A closure or cover cap 126 is secured to the plate or surface 100, as by removable screws 128.

It will now be apparent that by pressing radially inward upon the actuator body 116, the wedging cam surfaces 114 of the same will be caused to expand the resilient arms 104, thereby releasing the mid-portions 124 thereof from their locking engagement in the ribs or grooves 66 or 68, 70, depending upon which type of spindle 58 or 59 is employed, whereby the locking member may be withdrawn from the spindle and released from its clamping or interlocking motion with the adjacent record disk received upon the spindle. When the lock member is replaced upon the spindle with the members 104 extended, the same will be lowered to contact the adjacent record disk, and the disk or stack of disks may be pushed downwardly upon and against the resistance of the spring 84, and upon release of the actuator body 116, the resilient members 104 will engage in the appropriate locking groove 66 or 68, 70.

Moreover, it will now be apparent that with the locking member pressed downwardly to its fullest extent upon the spindle, the foremost of the record disks will have its interlocking groove positively locked against the locking ring 80 carried by the base of the album or pressed against the cushioning ring 80 if the latter is used; while the topmost record will, in turn, be positively interlocked with the locking ring 92 carried by the locking member. Thus, the entire stack of record disks will be positively locked to each other and to the album to prevent rotation between the disks and of the disks.

Further, when the type of spindle 59 is employed, as shown in Figure 12, the stack of record disks will be positively locked to the album at the base 14, and by engagement of the resilient members 104 in the chordal locking grooves 68 and 70 of the spindle 59, the topmost record of the stack will also be positively locked against rotation upon the spindle 59.

*Adjustable disk support stop*

Figure 2:
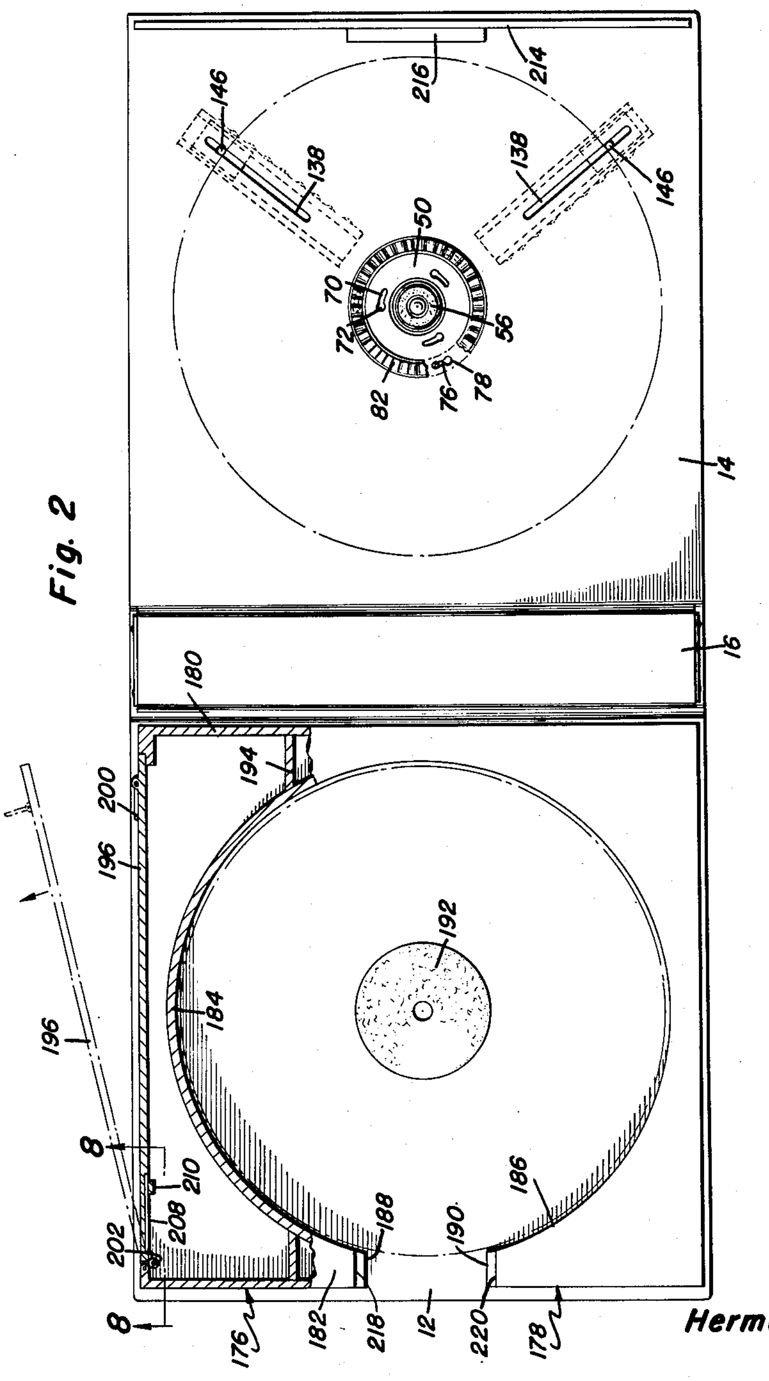
Figure 3:
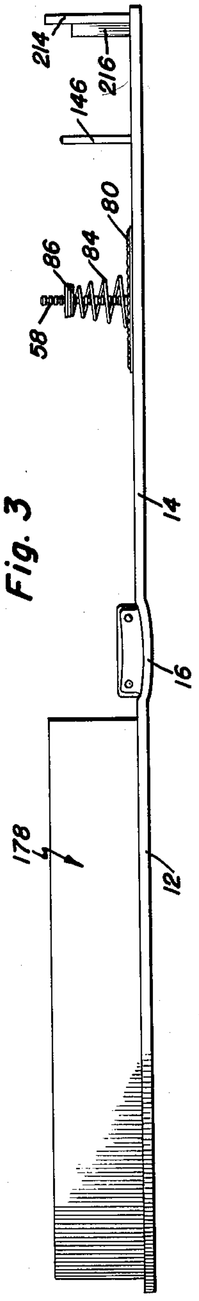
Figure 3 is a side elevational view of the arrangement of the embodiment as shown in Figure 2.

Attention is next directed more specifically to Figures 2, 6 and 7 for a description of the adjustable stop means to assist in supporting and positioning the stack of records in the album. As will be apparent from Figure 2, two or more adjustable stops are provided for abutting the edges of a stack of records when the stack is secured upon the spindle and assist the latter in holding the stack and the individual records thereof against relative movement or against movement of the entire stack with respect to the spindle. This supporting means is adjustable in order that the album may accommodate stacks of records of different dimensions.

As shown in the drawings, the back 14 is provided in its upper or inner surface with recesses or channels 130 which may extend radially with respect to the spindle or in any other convenient relation, if desired, and which, in the interest of compactness, are preferably extended toward the corners of the album back. Secured in these recesses or channels, in any desired manner, as for example by integral downwardly struck lugs 131, are channel members 132 constituting, as shown in Figure 7, a closed bottom wall together with inturned top flanges 134, the latter being spaced from each other to provide a longitudinally extending, medially disposed slot 138 in the top of the channel member. It is of course intended that the flanges 134 of the channels shall be overlaid or covered by a suitable covering 136 in accordance with the manner previously described.

The slot formed between the adjacent edges of the inturned flanges 134 of the channel member 132 is more clearly shown in Figures 2 and 6. Secured in any desired manner within the channel member 132 and carried by or fixed to one side wall of the same or, if desired, formed in a portion of one side wall of the same, is a resilient spring member 140 in the form of a flat strip having bowed portions 142 to facilitate flexing or resilient yielding of the member in a direction laterally of the channel member. Slidable in the channel is a slide including a flat body or base 144 having an upstanding pin 146 extending upwardly through the slot 138 and being slidable therealong. It is intended that this pin shall constitute the abutment surface or member for engaging the edges of a stack of record disks and for supporting or securing the same with respect to the spindle. The two support pins 146 serve a further and very important function. When properly positioned for a stack of record disks of a given size, they will operate as guide means for properly aligning the center apertures of disks for insertion upon the spindle, minimizing delay or wear on the central aperture through fumbling efforts to insert the same upon the spindle. While the abutment member 146 is depicted as a pin, it is intended that other constructions such as plates could be employed; and it could be appropriately shaped at its abutting surface to specifically engage various sizes and types of disks.

Upon the side of the slide 144 there is provided a resilient tongue 148 having a bowed or flexed portion 150 extending outwardly from the slide and selectively and yieldingly engageable with the bowed portions 142 of the member 140. Either one or both ends of the member 148 may be fixedly secured to the side of the slide 144 so as to impart the desired yielding characteristic for resilient engagement of the portion 150 with the portions 142. It will now be seen that when the slide is moved longitudinally of the channel member the same will be resiliently locked in selected positions along the member. By properly spacing the portions 142, the slide may be locked in selected positions corresponding to the dimensions of different types and sizes of record disks.

*Spindle adaptors for small records*

In the mechanism of the storage album as hereinbefore described, it will be seen that the spindle itself is adapted to snugly and slidably receive the conventional types of phonograph records, of ten, twelve or more inches in diameter, and which are provided with the customary relatively small spindle aperture. At the present time, however, and there will be increasingly in the future, an increasing proportion of phonograph record disks to which reference is made in this application as small record disks, these being various constructions of record disks adapted to be rotated at 45 and 33⅓ R. P. M. In these disks, the central portion thereof is provided with a relatively large aperture for receiving a special spindle, or spindle adaptor, for mounting these disks upon the turntable of the record player. Accordingly, it is highly desirable that a record disk album shall be inherently capable of use with this conventional but much newer type of disk than the old conventional previous types heretofore well known.

In order to adapt the present invention to accommodate these small disks either alone or in combination with the conventional larger disks, certain adapters to be now described are employed.

Referring now more specifically to Figures 15–21, it will be observed that these adapters comprise a sleeve or bushing of the type shown in Figures 17–19 in conjunction with an adapter spring of the types illustrated in Figures 15 or 21.

The adapter sleeve, or adapter, as the same is generally referred to in this specification, is indicated generally by the numeral 152 and obviously may, within the purview of this invention, be embodied in various shapes, dimensions and materials. One suitable and highly satisfactory construction consists of a tubular, cylindrical sleeve 154 which is open at its bottom end, is closed at its top end as by a top wall 156, the latter being apertured as at 158, in order that the adapter may be snugly but slidably received upon either of the spindles 58 or 59 previously described. Upon its lower edge, the wall portion 154 of the adapter is preferably provided with a plurality of depending headed fasteners 160, each of which is intended to detachably register with and be connected with the above described arcuate bayonet slots 70 and 72 appearing in the anchor plate.

The arrangement is such that the adapter may be placed upon the spindle 58 or 59, when no records are applied thereto, and may be moved downwardly upon the spindle when the above mentioned conical compression spring 84 received within the hollow body of the adapter 152, so that the depending headed fasteners 160 may be directly applied to the fastening bayonet slots in the anchor plate, at which time the adapter will be locked to the anchor plate, as shown in Figure 16, and may thus constitute a new spindle or arbor upon which the large apertures of the small disks may be received.

Certain types of small disks in their relatively large spindle-receiving apertures are provided with radially extending notches to receive keys of the spindles upon which they are mounted, and to accommodate disks of this character, the embodiment of adapter shown in Figure 18 is employed, the same being indicated generally at 162. As in the preceding embodiment, this adapter includes the cylindrical, tubular side walls 154 which are open at their bottom end and are closed at the top as by a top wall 156 provided with a central aperture 158. Extending radially from the side walls 154, and preferably from the top to the bottom of the same, is a longitudinally extending, radially disposed rib or key 170 adapted to be received in the notches of the above mentioned particular type of small disks.

In addition to the adapter of Figures 17–19, there is provided an adapter spring, the same consisting of a coil compression spring 166 which, at its extremities, is provided with annular plates or rings 168 and 172, these rings being provided with teeth as at 174. The rings 168 and 172 are of the proper size and configuration in order to establish an interlocking engagement with the ring 92 of the lock member, and with the interlocking rings formed as a part of the interlocking type of record disks.

As will be obvious, either or both of the rings 168 and 172 could be omitted, together with this interlocking feature.

Further, the ring 168 could be omitted, and the upper end of the coil spring 166 could then be selectively received in one of a series of apertures formed in the lower face of the locking member plate 88, in the manner shown in Figure 15.

The compression spring 166, as illustrated in Figures 15 and 16, is adapted to encircle or surround the adapters 152 or 162 and to have its ends thereagainst the lock member disk 88 and the adjacent interlocking ring carried by the adjacent record disk received upon the adapter. Thus, pressure is exerted between the locking member 88 and the series of record disks which surround the adapter 152 or 162, to thus apply a compressive and interlocking force to the stack of record disks.

*Album front cover construction*

From an inspection of Figure 4, it will be seen that the back cover of the album, 14, is substantially flat, and is free of side walls, so that access can be had to the stack of records retained upon the spindle and secured to the album back by the adjustable stop means, from substantially all sides of the same except for the presence of the adjustable stops.

The walls which are intended to enclose the record stack assembly and the associated mechanism secured to the album back are all carried by the album front cover 12. As will now be more readily seen from Figures 2 and 4, the front album cover 12 has mounted thereon and secured thereto in any desired manner side wall assemblies indicated generally by the numerals 176 and 178. Conveniently, these assemblies may consist of upstanding walls 180 suitably positioned with respect to each other and secured to the front cover, these walls being provided with a covering 182. Adjacent faces of the wall assemblies 176 and 178 are arcuately notched or recessed, as at 184 and 186, to define therebetween and enclose a circular well or chamber of sufficient magnitude to receive and enclose the spindle assembly, the adjustable stops and the stack of records supported thereby when the front cover is folded upon the back cover of the album and the article is in its closed position as illustrated in Figures 1 and 5. At one end of the recesses 184 and 186 the wall assemblies 176 and 178 have their extremities faced from each other, as at 188 and 190, to provide an opening or notch for a purpose which will subsequently become apparent. Preferably, a suitable cushioning pad of felt or other material 192 is mounted upon the inner surface of the front cover 12 substantially centrally of the circular well defined by the recesses 184 and 186, and this pad serves to receive, cushion and protect, the lowermost of the interlocking ring portions of a record disk.

It is intended that this well shall serve as a depository for the temporary accumulation and retention of record disks which are removed from the storage spindle 58 or 59 when the album is open and the records stored therein are being employed or used. It will now be evident that this well serves to prevent accidental displacement or dropping of the records so removed from the spindle of the album, and serves to retain the records deposited in the well in a stacked position with their adjacent interlocking portions in interlocking engagement, thereby preventing relative rotation of the records within the stack in the well, as well as slippage of one record with respect to another, in order to protect the sound tracks of the records against damage.

The opening between the ends 188 and 190 of the wall assemblies 176, 178 serves to permit the user to obtain access to the records stored in the well for lifting or depositing the same.

When closed, the two wall assemblies 176, 178 rest upon the back cover 14 and serve to completely enclose the space between these covers with the assistance of the album middle 16.

In order to provide a convenient storage place for the album adapters previously described, when the same are not in use, there is provided a storage compartment in one of the wall sections, preferably the top section 176. This compartment is formed by providing a bottom wall or partition 194 which extends between the inner and outer edges of the wall section, and by providing a hinged closure 196 for permitting access to the compartment. The closure 196 is hinged, as at 198, to the top portion of the album middle 16, in any desired manner, and at its other extremity may be provided with a fingergrip 200 by means of which the hinged closure may be opened or shut. Preferably, a spring is provided for resiliently urging the closure to its closed position. This spring may take the form of a coiled torsion spring 202 which is loosely received upon a retaining pin 204, and which has one end of the spring, as at 206, seated in the covering portion 182 of the wall section 176, and having its other extremity 208 slidably secured to a lug 210 mounted upon the under surface of the closure 196. This arrangement of the spring is clearly shown in Figure 8 and the operation of the same will now be evident from the full and dotted line showings of Figure 2.

The over-all rigidity of the album in its closed position, and the interengaging or locking action of the front and rear covers of the same is greatly enhanced by a built-in locking lug arrangement. Referring particularly to Figures 2–5, it will be seen that the back cover 14, at what may be termed its outer, vertical edge when the album is in its stored position, shown in Figure 1, is provided with a vertical wall 214 which is parallel to the outermost edge of the back cover, is closely adjacent thereto, and terminates slightly inwardly from the upper and lower edges of the cover.

The outer surfaces of the portions 176 and 178 of the front cover 12 are adapted to be slidingly received and abutted against the inside surface of the vertical wall 214 when the album is in its closed position, as will be apparent from Figure 5. Thus, the wall 214 serves to engage, reinforce, and to some extent cooperate with the members 176 and 178 to provide rigidity to the album in its closed position.

An additional locking means is provided for further reinforcing and rendering more rigid the engagement of the front and back cover. For this purpose, the back cover 14 is provided with an upstanding lug, lock or body member 216 which is secured to the back cover 14 and to the inside surface of the vertical wall 214 intermediate the ends of the same in any desired manner, but preferably so as to form a rigid extension of these portions.

As shown in Figure 2, the opening or slot formed between the adjacent vertical surfaces 188 and 190 of the members 176 and 178 are provided with laterally enlarged portions in the form of horizontal shoulders 218 and 220, respectively. The proportions and dimensions of the locking block 216, the slot between the surfaces 188 and 190, and the relative proportions of the enlargements 218 and 220 is such that when the album is in its closed position, the vertical surfaces 188 and 190 will embrace the vertical end edges of the locking block or body 216, while the lateral enlargements comprising the horizontal surfaces 218 and 220 will rest upon the upper edge of the block 216. This arrangement is shown in the closed position of the album in Figure 5.

By means of this arrangement, it will be apparent that when the album is loaded and stored in the closed position shown in Figure 1, relative movement between the front and back cover is further prevented by the interengagement of the slot between the members 176 and 178 with the side and top surfaces of the locking block or lug 216. This, in conjunction with the locking engagement of the spindle with both the front and back covers, and the further bracing action of the members 146 with the stack of records upon the spindle, serves to render the entire device much more rigid in its construction, and thus eliminates a frequent cause of failure of the previous envelope-type of record disk storing albums.

*Operation of album in storing records*

As aforesaid, the album is intended for use in storing all conventional types of phonograph record disks. While the illustrations of this album and the specific description pertaining thereto have referred only to disks of the interlocking type, as set forth in my above identified copending application, it will be readily appreciated that all of these conventional types of disks without the interlocking feature or construction could likewise be stored in the album without change, except that the advantages of the interlocking of the disks would not be realized.

As disclosed and claimed in the above mentioned copending application, the interlocking type of disk is provided with an annular portion or ring formed upon or applied thereto and concentric with the spindle aperture of the disk which serves the dual functions of providing a serrated surface forming a clutch member to prevent relative rotation of the disks with respect to each other or with respect to a contacting surface, and also serves to slightly but positively space the disks from each other so that there is no danger of the sound track of one disk rubbing against the sound track of an adjacent disk, even though these sound tracks and disks might be slightly warped, a condition which would normally arise in customary usage.

As shown in Figure 5, when disks of only the conventional type, with the small spindle apertures therein, are to be stored, the same will be placed upon the spindle 58 or 59, and will rest upon the pressure pad 86 carried by the resilient means 84. When the full complement or capacity of the spindle is utilized for storing disks, the bottom disk will have its interlocking ring pressed into contact with the fixed or stationary interlocking ring 80, previously mentioned, and which is detachably secured to the bottom cover 14 of the album. At this time, the spring 84 will be completely collapsed and recessed within the recessed portion 56 of the anchor plate 50. The locking member will then be applied to the spindle, and its clutch member in the form of the locking ring 92 will be engaged upon the interlocking portion of the topmost disk of the stack, whereby the locking member will compress the stack of disks into interlocking engagement with each other and with the bottom locking ring on the back of the album, and the adjustable stops will then be positioned to cause the same to contact the edges of the stack of disks and assist in supporting the weight of the same and in holding the disks tightly against the spindle without any relative radial movement.

When the cover or top of the album 12 is now closed, the upper end of the spindle will penetrate the aperture in the plate 34, and the latch member 40 will be engaged to thus further support the spindle from the front cover as well as the back cover of the album, and lock the two covers together, to thus securely and completely enclose the stack of disks, each member of which is now locked against rotation with respect to the other disks as well as with respect to the spindle; and which are further supported and locked against shifting movement.

When it is desired to remove a disk, the latch is released, the front cover is opened back into the position shown in Figure 2, and the locking member is removed. Upon removal of the locking member, the spring 84 will raise the stack of disks, thereby facilitating the removal of the disks from the album. Disks temporarily discarded and placed aside before being restored to the spindle may then be satisfactorily retained in the well portion of the front cover. When less than the full complement or capacity of the spindle is to be utilized for storing record disks thereon, the stack of disks will assume the position shown in Figure 5, at which time the stack will be held upwardly against the lock member, which, of course, may be placed in various adjusted positions upon the spindle. Generally, however, when it is intended to store the album or close the same with less than its full complement of disks therein, the lock member will be pressed downwardly to its fullest extent, thereby completely collapsing the spring, as when the album is full of disks, so that the lowermost disk will again rest upon the clutch or interlocking ring 80.

Assuming now that it is desired to store in the album the small type of record disks having the large spindle aperture therethrough, the adapter and adapter spring shown in Figures 17–19, 21 is employed. If only the small disks are to be stored, then the arrangement shown in Figure 16 is utilized. In that case, the selected adapter, 152 or 154, is secured to the anchor plate by engagement of the fastening members 160 in the bayonet slots 70 of the anchor plate, with the coil spring 84 being housed within the adapter, since this spring performs no useful function while the adapter is being used. The series of small disks are then placed over the adapter, and the adapter spring 166 is then applied. When the locking member is then placed upon the upper end of the spindle and pressed downwardly thereon, the locking member will tension the spring 166 and cause the lower plate, flange or locking ring 172 thereof to press downwardly upon the adjacent interlocking portion of the topmost disk, whereby the entire stack of disks will be compressed into interlocking engagement with each other and with the bottom locking ring 80. The parts will then be in the position shown in Figure 16.

As in the preceding use of the device, shown in Figure 5, the stack of disks is thus subjected to the tension of a spring for maintaining the interlocking engagement with each other, except that now it is the adapter spring which applies the tensioning force downwardly, whereas in the arrangement of Figure 5 it is the spring 84 which applies the tensioning force upwardly.

The use of the locking rings 168 and 172 at opposite ends of the adapter spring 166 produces the following advantage. When the spindle of Figure 12 is employed, the locking member is restrained against relative rotation, since the locking arms of the lock member are engaged in the flat end walls of the chordal slots 68 and 70, thereby preventing rotation of the lock member. In turn, the interlocking engagement of the ring 168 with the ring 92 carried by the locking member tends to prevent rotation of the adapter spring.

The lower locking ring 172 of the adapter spring in turn interlockingly engages the top of the stack of disks thus applying a rotation preventing force or engagement at the top of the stack, a similar rotational force being applied to the bottom of the stack by the fixed locking ring 80 as shown in Figure 16. If now one of the disks in the stack is not of the interlocking type, this arrangement will prevent rotation of the upper half of the stack which might occur if additional rotation-preventing force was not applied to both ends of the stack.

In addition to the foregoing uses, the album is further adapted to satisfactorily store records of both the small aperture and large aperture types at the same time. Thus, as shown at 15, a stack of records of the small aperture type may be first mounted upon the spindle at the bottom thereof, and then the adapter 152 or 162 may then be applied with its lower end resting upon the central portions of the topmost plate within the interlocking ring of the same. Next, the series of record disks having the large apertures are applied over the adapter, whereupon the adapter spring 166 is installed, whether of the type shown in Figure 21 or of the type shown in Figure 15, and the locking member is then applied. As will now be seen, each of the two sets of disks is maintained by spring pressure from opposite end sides of the same in a close interlocking engagement, while the adapter properly positions the large aperture disks with respect to those of the small aperture.

Moreover, when the adapters are not in use, the same may be conveniently stored in the storage chamber provided in the compartment of the front cover of the album.

From the foregoing, it is thought that the construction, operation and many advantages of the invention together with the basic principles of the same will now be readily understood after a consideration of the foregoing specification and accompanying drawings, and accordingly further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus described the invention, what is claimed as new is as follows:

1. A phonograph record album including front and back covers joined for folding movement, a fastener carried by one cover and extendable through an aperture in the other cover, said other cover having in its outer surface a recess surrounding said aperture, a latch on said other cover disposed in said recess and engageable with said fastener for securing said covers in closed position, said fastener including a spindle for receiving thereon a stack of superposed record disks, a lock means freely rotatable and axially adjustable upon said spindle for clamping a stack of record disks thereon, toothed means causing said lock means to non-rotatably engage a record.

2. In a phonograph record album having a cover, a spindle fixedly mounted on said cover for receiving a stack of record disks thereon, a lock means retaining a stack of record disks on said spindle, said spindle having a plurality of annular locking recesses in the exterior surface of the same and spaced longitudinally of said spindle, said lock means having a latch embracing said spindle and releasably engageable selectively with said recesses.

3. The combination of claim 2 wherein said recesses are each spaced from an adjacent recess by a distance which is an integer multiple of the thickness of a record disk.

4. The combination of claim 2 including resilient means for urging a stack of records mounted upon said spindle against said locking means.

5. The combination of claim 2 including a clutch member, means for detachably mounting said clutch member upon said cover, said clutch member having positive interlocking engagement with a record disk.

6. In a phonograph record album, a spindle of a diameter to snugly and slidably receive thereon a plurality of large record disks of the interlocking and small spindle aperture type, an adapter snugly and slidably received on said spindle and of an exterior diameter for snugly and slidably receiving thereon a plurality of small record disks of the interlocking and large spindle aperture type, a lock member secured to said spindle and adjustable longitudinally thereof, resilient means adapted to urge a stack of large record disks against the adjacent end of said adaptesr and maintain said large records in interlocking engagement, a spring engaging said lock member and adapted to urge a stack of interlocked small records longitudinally of said adapter and into interlocking engagement with said stack of large records.

7. In a phonograph record album, a spindle of a diameter to snugly and slidably receive thereon a plurality of large record disks of the interlocking and small spindle aperture type, an adapter snugly and slidably received on said spindle and of an exterior diameter for snugly and slidably receiving thereon a plurality of small record disks of the interlocking and large spindle aperture type, a lock member secured to said spindle and adjustable longitudinally thereof, resilient means adapted to urge a stack of large record disks against the adjacent end of said adapter and maintain said large records in interlocking engagement, a spring engaging said lock member and adapted to urge a stack of interlocked small records longitudinally of said adapter and into interlocking engagement with said stack of large records, a clutch on said lock means, clutches on opposite ends of said spring engaging said lock means clutch and the adjacent interlocking member of said stack of small records.

8. In a phonograph record album, a spindle of a diameter to snugly and slidably receive thereon a plurality of large record disks of the interlocking and small spindle aperture type, an adapter snugly and slidably received on said spindle and of an exterior diameter for snugly and slidably receiving thereon a plurality of small record disks of the interlocking and large spindle aperture type, a lock member secured to said spindle and adjustable longitudinally thereof, resilient means adapted to urge a stack of large record disks against the adjacent end of said adapter and maintain said large records in interlocking engagement, a spring engaging said lock member and adapted to urge a stack of interlocked small records longitudinally of said adapter and into interlocking engagement with said stack of large records, a clutch on said lock means, clutches on opposite ends of said spring engaging said lock means clutch and the adjacent interlocking member of said stack of small records, stop means engageable with the edges of a stack of records on said spindle for limiting radial movement of said records relative to said spindle, said stops being mounted for individual adjustment towards and from said spindle to accommodate stacks of disks of different diameters.

9. A phonograph record album comprising movable front and back covers, a spindle on a cover for retaining in stacked, interlocked relation a plurality of record disks of the interlocking type, means on a cover for supporting a stack of disks retained on said first means against radial movement relative thereto, a fastener mounted on said cover and engageable with said spindle for retaining the album covers in closed position, toothed means fixedly secured to a cover to interlockingly engage a record for positively preventing rotation of said stack of interlocked disks.

10. A phonograph record album comprising movable front and back covers, means on a cover for retaining in stacked, interlocked relation a plurality of record disks of the interlocking type, means on a cover for supporting a stack of disks retained on said first means against radial movement relative thereto, means engageable with said first means for retaining the album covers in closed position, means fixedly secured to a cover for preventing rotation of said stack of interlocked disks, said first means including a spindle for snugly and slidably receiving the small spindle apertures of record disks of the large type, an adapter slidable upon said spindle for receiving thereon the large spindle apertures of record disks of the small type, means for yieldingly urging both types of disks into interlocked engagement as a unitary stack.

11. In a phonograph record album having front and back covers, means on one cover for retaining thereon a stack of record disks in interlocked, non-rotative, fixed position, said other cover having wall portions forming a well for embracing the stacked disks on said one cover when said album is closed and comprising a receptacle for loose disks when the album is open, said first means including channel members recessed in a cover and having their upper portions longitudinally and medially slotted, slides retained in and movable longitudinally of said channel members, posts rising from said slides and extending through said slots for abuttingly engaging the edges of a stack of record disks, means for yieldingly and releasably locking the slides to the channel members at predetermined positions spaced longitudinally of said channel members.

HERMAN H. MUELLER.

References Cited in the file of this patent

UNITED STATES PATENTS

| Number | Name | Date |
|---|---|---|
| 774,037 | Burgi | Nov. 1, 1904 |
| 1,086,495 | Wigginton | Feb. 10, 1914 |
| 1,288,610 | Jones | Dec. 24, 1918 |
| 1,320,958 | Albrecht | Nov. 4, 1919 |
| 1,675,852 | Geer | July 3, 1928 |
| 2,404,224 | Fink | July 16, 1946 |
| 2,446,641 | Daymon | Aug. 10, 1948 |
| 2,494,359 | Roth | Jan. 10, 1950 |

FOREIGN PATENTS

| Number | Country | Date |
|---|---|---|
| 177,309 | Great Britain | May 30, 1922 |
| 749,720 | France | May 8, 1933 |